United States Patent Office 3,139,351
Patented June 30, 1964

3,139,351
WATERPROOFING PREPARATION
Neville A. Hammer, Sr., 617 W. Woodrow Ave.,
Knoxville 18, Tenn.
No Drawing. Filed Aug. 28, 1962, Ser. No. 220,037
6 Claims. (Cl. 106—89)

The present invention relates to a waterproofing composition for masonry. More particularly, this invention relates to a composition for the sealing and stopping of pores, cracks, and holes in masonry and concrete walls, floors, and the like, for permanently preventing the passage of water.

There are many waterproofing compositions on the market today, all of which intend to seal pores and the like, but it has been found in practice that they are not effective for stopping such pores, cracks and holes and exhibit, at best, only a temporary action. Moreover, many of these known compositions are undesirable because they will not bond to freshly poured concrete. Others will not bond to old concrete. A great many of the waterproofing compositions available today must be carefully mixed into a paste form and applied by a trowel, requiring a skilled craftsman to produce a result.

Many waterproofing compositions that are now available when employed in liquid or slurry form, must be agitated and kept in continual motion to prevent solid components from "settling out." Most objectionable, however, is that presently available waterproofing preparations cannot be applied to masonry areas affected with running water.

Still other commercially available materials require that the masonry area to be treated must be slightly dampened or moistened, severely limiting the speed of application and often requiring additional labor since only a small area of masonry can be maintained in a sufficiently dampened state, without drying, for any given period of time. Even these materials cannot be applied to pores and cracks having a condition of flowing or moving water. Other commercially available preparations require a great deal of physical effort to rub them into the pores that exist in all masonry products, and especially in cinder blocks. Almost all commercially available preparations require a drying period, and/or two or more applications, before they will effect even temporary water stoppage.

It is a principal object of this invention to provide a waterproofing composition that will overcome all of the above-mentioned disadvantages of prior art waterproofing preparations.

It is another object of this invention to provide a composition for the waterproofing coating of masonry containing a mixture of an alkaline earth oxide, a settable binding ingredient, an alkali metal halide and alkali metal carbonate.

Still another object of this invention is to provide a composition of matter which will stop relatively large cracks and holes in masonry and concrete walls, even though water be flowing through these cracks and holes at the time of application.

A further object of this invention is to provide an inorganic waterproofing solution which can be easily and effectively applied to a wet or dry masonry structure.

It is a further principal object of this invention to provide for the preparation of an inorganic aqueous paint composition for the waterproofing of masonry wherein said inorganic composition comprises a blended powdered mixture containing about 54% lime, about 37% Portland cement, about 8% common rock salt and about 1% soda.

Other objects and advantages of this invention will become more apparent when reference is had to the following detailed description and accompanying examples.

In accordance with this invention, there is provided a composition for use as a waterproofing solution, paste, or putty for the substantially effortless brush, spray, or trowel application to dry or wet masonry materials.

To accomplish this result, the present invention envisions the preparation of a composition for the waterproof coating of masonry, comprising a mixture of lime, cement, salt and soda.

Unexpectedly, it has been found that the waterproofing composition of this invention, consisting of the above noted ingredients in admixture with water, will have the immediate effect of stopping water seeping through masonry surfaces, even when this composition is applied to masonry surfaces that are wetted by seeping water during the application of this composition.

In its preferred form, the improved composition of this invention comprises a dry mixture of the following construction:

| | Percentage parts by weights |
|---|---|
| Lime (calcium oxide, CaO) | 54 |
| Cement (Portland cement) | 37 |
| Salt (sodium chloride, NaCl) | 8 |
| Soda (sodium carbonate, $Na_2CO_3$) | 1 |
| | 100 |

It is preferred that all of these materials be used in finely ground or finely powdered form. While the given percentages are preferred, it is to be understood that they may be subjected to some variation i.e. a variation of the order of 2 to 6% in the recited compositions, without deleteriously affecting the working properties of the composition of this invention, although the given percentages within the indicated variation are surprisingly critical.

The exact manner in which the several components of this novel composition coact is not fully understood, but the following explanation of how the several components are believed to act may be helpful.

The Portland cement is believed to act as a base and carrier for the other ingredients and, of course, acts as a hardening and solidifying agent. The calcium oxide acts in a similar way and increases the rapidity of the hardening of the compound. In addition, it combines with water, causing the compound to swell in the pores and other openings of the masonry.

Sodium carbonate also combines with a great quantity of water and may pick up ten or more molecules of water per molecule of sodium carbonate, holding the same in a firm and solid state. As it picks up water, the sodium carbonate is believed to swell and fill many small pores that may occur in the masonry as well as in this sealing composition as it undergoes expansion and contraction due to the respective wetting and drying stages that may occur over the life of the composition. Moreover, sodium carbonate acts to make the composition of this invention more "workable" and more easily spreadable. The sodium chloride, preferably ground or powdered rock salt, acts as a hardener and curing agent and also dissolves and acts as a sealer. Once set, it will not again melt or dissolve. A silicate may be added to serve as a diluent and filler and also act to retard the speed of setting. However, it is obvious that diluents will weaken the result and they should only be used if this is desired.

Other additives, such as pigments and coloring materials are often desirable for decorative purposes. Fibrous fillers and inert thickeners, caulking and packing materials may be also employed when it is desired to repair large holes, cracks and fissures.

It is believed that the novel coaction of the components of this invention constitutes a synergistic chemical action since the omission of any of the separate components will not give an acceptable and useful result.

For use, the above noted dry mixture is mixed with sufficient water to give a flowable liquid, fluid, or paint consistency which can be applied to any surface desired to be sealed by means of a brush, roller, spray gun or the like device. The composition will set watertight immediately, and will hold back a considerable flow of water while setting due to the synergistic chemical co-action of the several components. The compound will tenaciously adhere to any surface, regardless of its smoothness, thereby forming an ideal sealing compound for damp basements, wet masonry walls, floors and the like.

Moreover, and as will be described hereinafter in Example III, the composition of this invention may be mixed with sufficient water to produce a putty or plaster-like composition, and combined with various relatively inert fillers and aggregates, if it is desired to fill and seal large holes, cracks and fissures and to provide smooth decorative surfaces. In such cases, the putty and plaster compositions of this invention may be worked with trowels and the like masonry tools, rather than with the brushes, etc. described above.

Many types of water have been tested for use in this invention. It has been found that the composition of this invention will work equally well with waters having the following generally accepted designations: distilled water, drinking water, river, lake and pond water, limestone water, sulfur water, freestone (Tennessee soft water), brackish water, generally available "mineral" waters and the like. Extremely muddy or "riled" water is undesirable due to its high clay content. Chemical waste liquors are generally objectionable due to the content of chemicals which may react or combine with the composition components of this invention.

When the components are provided in substantially commercially pure form and the water employed is generally clear, the composition of this invention will provide a cloudy white solution when mixed with water and especially when mixed in equal proportions by volume with water. Although some settling is evidenced after standing from four to six hours, the solution may be readily and easily stirred to reobtain the proper suspension. It is this water solution stability that is also a surprising feature of the present composition when compared with commercially available prior art materials.

Generally speaking, in the preparation of the aqueous mixture of this invention, the proportion of dry solids to water can be varied depending on the individual need and the result desired for the particular situation. However, and as a rule, it is convenient to use one part of dry solids to one part of water, on a volume basis, although other mixing proportions will also be found satisfactory.

The invention will now be more fully understood when reference is had to the following examples.

*Example I*

Twenty-seven pounds of commercially available lime (CaO), eighteen and one-half pounds of commercial cement, four pounds of common commercial grade rock salt (NaCl) and one-half pound of commercial soda ($Na_2CO_3$), all obtained in a dry and powdered form, were introduced into the hopper of a commercial mixer, blended in the dry state and emptied into a suitable container. To this mixture was added sufficient water, about six gallons, to obtain a flowable liquid mixture.

The mixture of this invention and like mixtures of several commercailly available waterproofing materials for masonry, mixed according to the directions given on the respective packages, were placed in suitable containers and taken to a building having a damp basement floor, often exhibiting seeping or moving water. All mixtures were carefully brushed onto equally damp areas of the floor and permitted to dry. In a short time, water seeped under the commercial products and caused them to blister and to break. The composition of this invention held firmly to the floor, exhibiting a good bond, and prevented water seepage.

*Example II*

Into the hopper of a commercial "dry" blender were poured thirteen and one-half pounds of finely powdered lime, nine and one-quarter pounds of finely powdered Portland cement, two pounds of finely powdered rock salt and one-quarter pound of finely powdered soda. The hopper was closed and the blender was run for about ten minutes. After the blender was shut off, the contents of the blender were emptied into a large paper sack to yield twenty-five pounds, dry weight, of the waterproofing composition of this invention.

A one gallon liquid measure was obtained and filled with a portion, about eight pounds, of the above blended composition. This "gallon" of powdered composition was emptied into a suitable larger vessel containing one gallon of ordinary "tap" or "faucet" water, followed by stirring for a few minutes to yield a cloudy-white, flowable, liquid paint.

For comparison purposes, several commercially available powdered waterproofing "cements" or compositions were also prepared at the same time according to their commercially available directions, by skilled craftsmen. These commercial mixtures and the paint mixture of this invention were prepared in a building having a basement from which a great quantity of water had just been drained, and into which water was continually seeping due to rainy weather outside. The basement was constructed of commonly available concrete blocks with concrete mortar seams and the floor was concrete. The several mixtures and the paint mixture of this invention were then applied to equally damp floor and wall areas by craftsmen who employed brushes as directed for each mixture. In painting wall areas, it was noted that the commercial mixtures tended to wet the brushes, brush handles and craftsmen themselves and great care and effort was required to brush and rub these mixtures into the damp cracks, openings and fissures in the concrete block walls. Surprisingly, it was discovered that the paint mixture of this invention did not run down the brush onto the brush handle and the worker, but showed an improved wetting action and a great affinity and cohesion for the concrete wall surface being painted. Moreover, very little effort was required to apply the paint of this invention since it tended readily to flow into the damp pores, openings, etc. of the concrete and form a seal therein. The same ease of application has also been noted on other concrete walls, whether new and wet or dry, or old and wet or dry, with the paint mixture of this invention.

After all the mixtures had been applied, second coats of each, including the paint of this invention, were applied as directed due to the extreme dampness existing in this location. Following this second application, all materials were examined as they dried. In all instances, the commercial mixtures did not "hold water" or form a firm seal. They dissolved, "leaked," peeled or dried, followed by blistering and cracking. Surprisingly, the paint of this invention formed a firm bond on all surfaces, dried, and maintained a firm bond and a moisture seal without "leaking," dissolving, peeling, blistering or cracking. The remaining areas of the basement were then perfunctorily cleaned of their commercial treatments and painted with the mixture of this invention. The entire basement has remained dry through repeated rainstorms and drying spells since this treatment.

*Example III*

To demonstrate the adaptability of the composition of this invention, a quantity of this composition, blended as in Examples I and II and containing about 54% calcium oxide, about 37% Portland cement, about 8% sodium chloride and about 1% sodium carbonate was mixed with sufficient water to form a smooth white liquid putty or plaster for the purpose of stoppering a large hole, about three-fourths inch in diameter in a basement masonry wall constructed from cinder blocks. Rain water was flowing through this hole and into the basement at a rate of about one gallon per minute.

A wadding or caulking material, consisting essentially of cotton string or yarn and containing no chemicals that are reactive with the composition components of the present invention was saturated with the liquid putty mixture prepared above and fitted into the hole with sufficient pressure to just stop the water from flowing with force. The putty mixture was observed to form an immediate seal and stopped all water flow almost immediately.

A similar putty or plaster, prepared from the composition of this invention to a "plastic" or "trowelable" consistency, was then troweled over the caulked or stoppered hole to provide a decorative and smooth finish. This "hole" has not since leaked through repeated rainstorms and drying spells.

While a few admixtures of the improved compound of this invention has been described above, together with theories which are believed to account for its unusually efficient action, it is to be understood that the invention is not limited to these exact compounding formulae or the exact procedures described, except insofar as such limitations are contained within the appended claims, nor is it intended that this invention is to be dependent upon the accuracy of the theories which have been advanced herein.

Having thus described the invention, what is claimed and desired to be secured by Letters Patent is:

1. A composition for the waterproof coating of masonry consisting essentially of a mixture of about 54 parts by weight of calcium oxide, about 37 part by weight of Portland cement, about 8 parts by weight of sodium chloride and about 1 part by weight of sodium carbonate.

2. A composition for the waterproof coating of masonry consisting essentially of a mixture of about 54 parts by weight of calcium oxide, about 37 parts by weight of Portland cement, about 8 parts by weight of sodium chloride and about 1 part by weight of sodium carbonate, each of said mixture components being present within a plus or minus variation in the order of 2 to 6% based respectively on each of the given amounts.

3. A method of preparing a coating composition for the waterproof coating of masonry, comprising the steps of blending together a material composition consisting essentially of about 54 parts by weight of lime, about 37 parts by weight of Portland cement, about 8 parts by weight of salt and about 1 part by weight of sodium carbonate, each of said material components being present within a plus or minus variation of 2 to 6% based respectively on each of the given amounts, said materials being mixed in dry and powdered form, and then mixing said mixed materials with sufficient water to produce a fluid coating composition.

4. A method of waterproofing masonry comprising the steps of mixing with water a dry composition consisting essentially of about 54 parts by weight of lime, about 37 parts by weight of Portland cement, about 8 parts by weight of salt and about 1 part by weight of sodium carbonate, each of said composition components being present within a plus or minus variation of 2 to 6% based respectively on each of the given amounts to produce a fluid coating composition, applying said fluid coating composition to masonry and drying said composition.

5. A method of sealing holes comprising filling said holes with a caulking material saturated with a fluid composition consisting essentially of sufficient water to form a fluid composition, and about 54 parts by weight of lime, about 37 parts by weight of Portland cement, about 8 parts by weight of salt and about 1 part by weight of sodium carbonate, each of said composition components being present within a plus or minus variation in the order of 2 to 6%, based respectively on each of the given amounts.

6. An inorganic cloudy-white aqueous suspension for the waterproof coating of masonry, said aqueous suspension exhibiting strong cohesion and wetting characteristics for masonry surfaces, said waterproof coating being characterized by a firm bond and waterproof seal, said aqueous suspension consisting essentially of a sufficient amount of water to make an aqueous suspension, and about 54 parts by weight of lime, about 37 parts by weight of Portland cement, about 8 parts by weight of salt and about 1 part by weight of sodium carbonate, each of said suspension components being present within a plus or minus variation in the order of 2 to 6%, based respectively on each of the given amounts.

References Cited in the file of this patent

UNITED STATES PATENTS

| 367,372 | Cushman | Aug. 2, 1887 |
| 1,796,269 | Rose | Mar. 10, 1931 |

FOREIGN PATENTS

| 632,333 | Great Britain | Nov. 12, 1949 |

OTHER REFERENCES

Lea and Desch: "The Chemistry of Cement and Concrete," Arnold (Publisher) Ltd., London, 1956, pp. 518–521 and 522.

"Webster's New International Dictionary," Merriam Publisher, Mass., 1960, page 2388.